United States Patent [19]

Moreland

[11] 4,156,112
[45] May 22, 1979

[54] CONTROL SYSTEM USING TIME DIVISION MULTIPLEXING

[75] Inventor: Charles E. Moreland, Hoffman Estates, Ill.

[73] Assignee: Control Junctions, Inc., Schaumburg, Ill.

[21] Appl. No.: 858,152

[22] Filed: Dec. 7, 1977

[51] Int. Cl.² .............................................. H04J 3/08
[52] U.S. Cl. ............................ 179/15 AL; 179/15 BS
[58] Field of Search ........... 179/15 A, 15 AL, 15 BS, 179/15 BA, 15 BM, 15 BY; 340/201 R

[56] References Cited

U.S. PATENT DOCUMENTS

| | | | |
|---|---|---|---|
| 3,757,050 | 9/1973 | Mizote | 179/15 AL |
| 3,870,825 | 3/1975 | Roberts et al. | 179/15 AL |
| 4,004,099 | 1/1977 | Jones et al. | 179/15 A |
| 4,052,566 | 10/1977 | MacKay | 179/15 AL |
| 4,052,567 | 10/1977 | MacKay | 179/15 AL |

*Primary Examiner*—Thomas A. Robinson
*Attorney, Agent, or Firm*—Emrich, Root, O'Keefe & Lee

[57] ABSTRACT

A control system for selectively communicating a plurality of sensors with associated remote control devices includes a Master Synchronizer, a transmitter for each sensor and a receiver for each control device. A single signal line is connected to all transmitters and receivers, and a single synchronization line couples the Master Synchronizer to all transmitters and receivers. The Master Synchronizer generates a time frame signal which has a reset portion for resetting all transmitters and receivers synchronously at the start of each frame, and a periodic portion which determines the time slots for each frame and which decrements counters in all transmitters and receivers synchronously. A time division multiplex system is used to communicate each transmitter with one or more associated receivers during a predetermined time slot of a periodic time frame determined by the Master Synchronizer. At the beginning of each frame, all counters are set to a predetermined number representative of the time slot allocated to those units. When their counters are decremented to zero, a time slot is defined for communicating a transmitter with its associated receiver or receivers. Thus a transmitter is permitted to send a signal along the signal line which causes a response only in the receiver whose counter has been decremented to zero during the same time slot. A decrementing counter in the Master Synchronizer defines the complete time frame; and when it reaches zero, the transmission of sync pulses to all transmitters and receivers is inhibited for a predetermined time. This absence of sync pulses is used to reset the Master Synchronizer and all transmitters and receivers at the start of each frame. An energy-containing signal, rather than the absence of a signal, is required to activate a control device.

11 Claims, 6 Drawing Figures

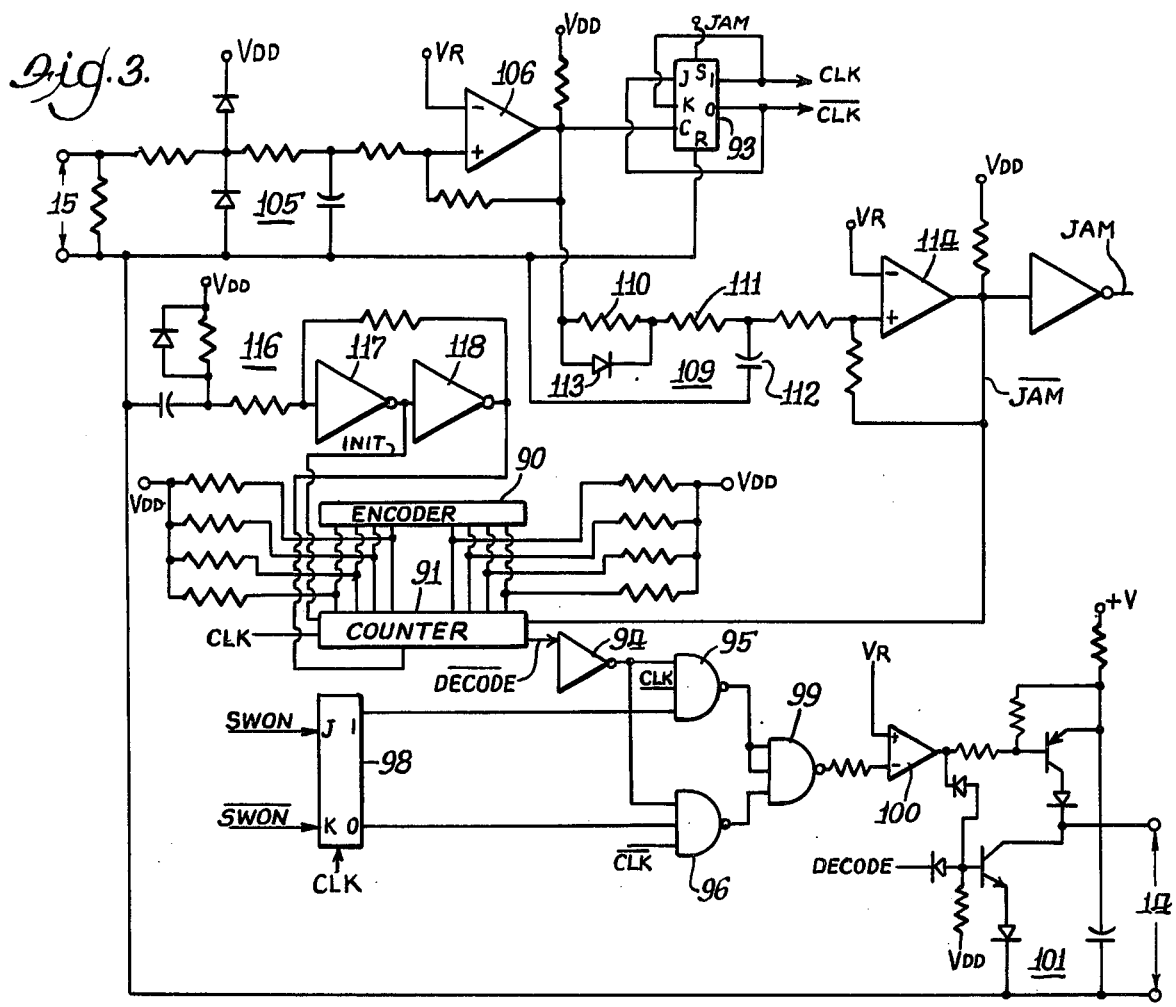
Fig. 3.
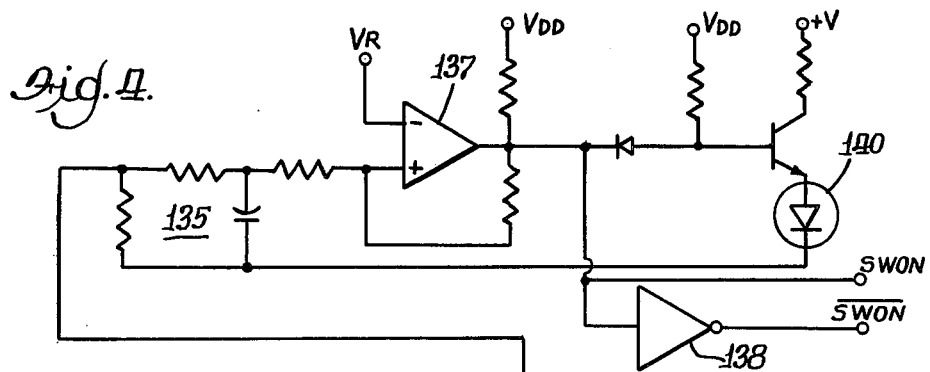
Fig. 4.
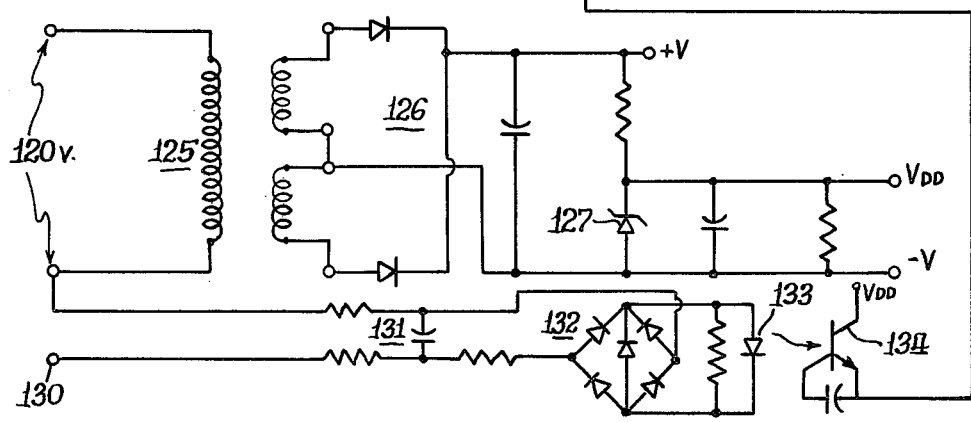

CONTROL SYSTEM USING TIME DIVISION MULTIPLEXING

BACKGROUND AND SUMMARY

The present invention relates to control systems; and more particularly, it relates to control systems wherein a number of individual sensors are used, and it is desired to selectively communicate each sensor with one or more control devices associated with that sensor. Control systems of this type may be used, for example, in large buildings where it may be desired to integrate all of the heating, ventilating, cooling, and even burglar alarm systems into a single master system. Control systems of this type have been in demand, and this demand has increased with the desire to manage energy consumption in large buildings. The sensor devices may be any of a large number of sensors, such as a thermostat calling for heat, a humidistat, a sun or light sensor, etc. Further, the control devices have an equally broad range of functions, including any device, alarm, or communication system that can be turned on and off by a switching signal.

Existing systems which provide such remote control take many forms. One of the techniques most frequently used commercially is to employ direct wiring from each sensor to all of its associated control devices. Although a direct wire system may have economic advantages for smaller installations, there is a break even point where for larger installations, the extensive cable and conduit which results becomes more expensive, and the installation costs increase disproportionately. Further, when such a direct wire system is installed in a large building it is expensive to modify it, and it is difficult to troubleshoot it.

Multiplexing systems have been suggested for overcoming the above disadvantages of a direct wire system. Some multiplexing systems are interconnected to a common conductor or utilize the power distribution network as the conductor between devices, control units and sensors. Phase encoding, frequency modulation, amplitude modulation or other encoding techniques or combinations of techniques have been utilized in multiplexing systems to selectively communicate one unit with another unit or a group of other units.

A primary consideration in the design of multiplexing systems of this type is reduction of the possibility of error; and as a result, extensive filtering, redundancy, encoding and other electronic techniques have been incorporated into these systems to minimize the possibility of error. The resulting multiplexing systems are thus expensive, relatively slow to react, inflexible and physically large. Thus, the advantage of these multiplexing systems over direct wire systems has been reduced.

A time division multiplexing communication system is disclosed in Schwartz U.S. Pat. Nos. 3,916,108 and 4,010,326. This system is intended to communicate computer terminals along a common information bus. A plurality of synchronization lines is fed to each terminal, and a unique combination of phase relationships among the synchronization signals is used for addressing each terminal. Another time division multiplexing system is disclosed in Maniere et al U.S. Pat. No. 3,601,534 wherein two parallel and juxtaposed transmission lines are used, one line being used to transmit synchronization signals from a central station and the second line being used to transmit information signals. Counters are used at receivers for counting synchronization pulses and using the count to identify received calls corresponding to an allotted time slot of the overall operating cycle or frame. This system is, however, characterized in that in each sending station, the information signals transmitted along one transmission line are derived from the synchronization signals transmitted along the second so that information is transmitted only in one direction around a loop because the synchronization pulses must propagate with the information signals and be compared at each sending and receiving station. Further, such system requires true transmission lines with distributed impedances to achieve the proper comparison of waveshapes of synchronization and information signals.

The present invention includes a transmitter for each sensor, a receiver for each control device and a Master Synchronizer. A single signal line is connected to all transmitters and receivers; and a single synchronization line couples the Master Synchronizer to all transmitters and receivers. The Master Synchronizer determines the overall time frame or operating cycle of the system, and the signal it transmits includes a periodic signal portion and a reset signal portion. Each cycle of the periodic signal defines a time slot in the time frame, and the reset signal portion is used to reset the Master Synchronizer and all transmitters and receivers at the same time, thereby achieving overall synchronization. Each transmitter and one or more associated receivers are allocated a predetermined time slot of the time frame, during which time slot the transmitters communicate with their associated receivers.

A decrementing counter is provided for each transmitter and each receiver. At the beginning of each frame, these counters are set to a predetermined number representative of the time slot allocated to those units. When the counter is decremented to zero, a time slot is defined for communicating a transmitter with its associated receivers. Thus, a transmitter is permitted to send a signal along the signal line to all receivers associated with it, and this signal causes a response only in those receivers whose counters have been decremented to zero during the same time slot. In the preferred implementation, this communication occurs once every time frame.

The Master Synchronizer also includes a decrementing counter, and when it reaches zero the transmission of synchronization ("sync" for short) signals to all transmitters and receivers is inhibited for a predetermined time. Thus, the absence of sync pulses is used as a reset signal to reset the Master Synchronizer and all transmitters and receivers once each time frame. An energy-containing signal, rather than the absence of a signal, is required to actuate a control device. This reduces error in the event of line interruption or power failure.

Other features and advantages of the present invention will be apparent to persons skilled in the art from the following detailed description of one embodiment of the invention, accompanied by the attached drawing wherein identical reference numerals will refer to like parts in the various views.

THE DRAWING

FIG. 3 is a circuit schematic diagram, partly in functional block form, of a transmitter in the system of FIG. 1;

FIG. 4 is a schematic diagram of circuitry which interfaces a control input with the transmitter of FIG. 3;

DETAILED DESCRIPTION

Figure 1:
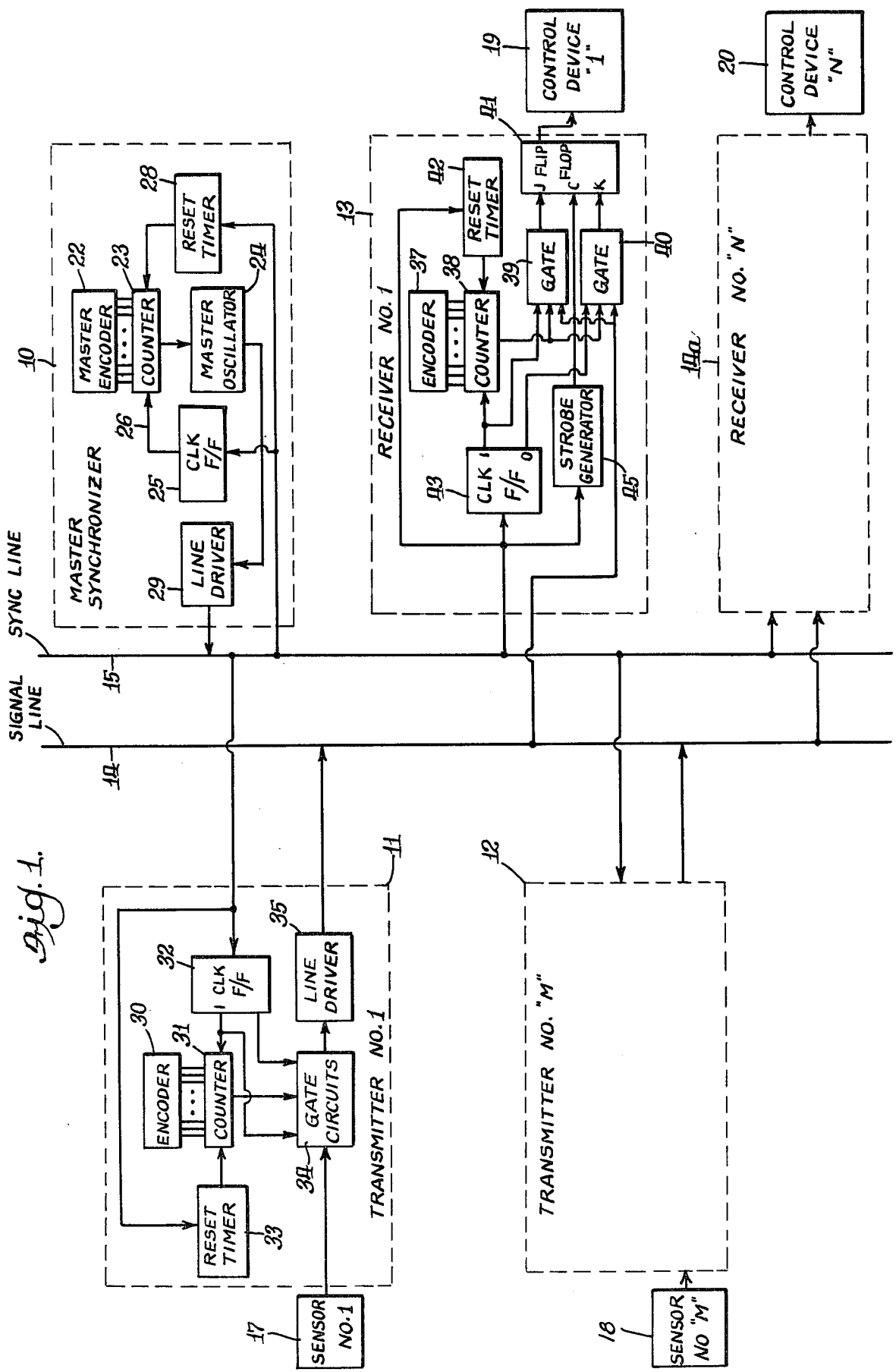
FIG. 1 is a functional block diagram of a system incorporating the present invention.

Referring first to FIG. 1, the system includes a Master Synchronizer which is enclosed within the dashed line 10, a plurality of transmitters, two of which are shown and enclosed within the dashed lines 11, 12, and a plurality of receivers, two of which are shown and enclosed within the dashed lines 13, 14a respectively. Persons skilled in the art will appreciate that the system is not limited to any particular number of transmitters or receivers, and that the number of transmitters may be different than the number of receivers. A signal line 14 is connected to all of the transmitters and receivers; and a sync line 15 is connected to the Master Synchronizer 10 and all of the transmitters and receivers.

As will be more fully explained below, the Master Synchronizer 10 generates a synchronization and timing signal which is coupled to all of the transmitters and all of the receivers. This synchronization and timing signal includes a reset portion and a periodic portion, both of which form a complete cycle or "frame". The reset signal portion of the signal is used to reset the Master Synchronizer and all transmitters and receivers at the beginning of each frame; and the periodic portion of the signal is used to define time slots within the frame. Each transmitter and its associated receiver or receivers is assigned or allocated a particular time slot during which time that transmitter communicates with all of its associated receivers via signal line 14. For example, the Master Synchronizer may define 256 time slots each frame, and by convention, these are numbered 0 through 255. The last time slot, namely 255, is reserved for system protection and utilization by the Master Synchronizer for frame detection. Supposing, then, that transmitter 11 in FIG. 1 is assigned time slot 0, then during that time slot it would communicate with as many receivers as may be desired by means of an information signal transmitted along the signal line 14. This transmitter and all of its associated receivers obtain common timing information from the sync line 15. Another transmitter and its associated receiver or receivers may be assigned time slot 1, and so on, up to transmitter No. "M" designated 12 in FIG. 1. Each of the transmitters has associated with it a sensor device, and these are designated 17 and 18 in FIG. 1 respectively for the transmitters 11, 12. Further, each of the receivers is connected to a control device, and these are designated 19 and 20 respectively for the receivers 13, 14a.

Each of the transmitters is similar in structure and operation, as is each of the receivers. The only difference in transmitters is the information or signals stored to identify its time slot, and the same is true for receivers. Thus, a complete understanding of the invention can be obtained from a description of only one transmitter and one receiver.

Still referring to FIG. 1, the Master Synchronizer includes a master encoder 22 having a plurality of binary outputs defining the number of time slots in a frame. These outputs are connected in parallel to the inputs of a decrementing counter 23. A master oscillator 24 generates a periodic signal coupled through a line driver circuit 29 to the sync line 15. The sync signal is received (after suitable filtering) by a clock flip flop 25 and a reset timer 28. The clock flip flop 25 divides the frequency by two and generates a signal labeled CLK on line 26 to decrement the counter 23. The output of the reset timer is used to load the contents of the master encoder 22 into the counter 23 at the beginning of each time frame. Briefly, the Master Synchronizer operates as follows. The output of the master oscillator 24 is coupled to the flip flop 25 (via the sync line) which is used as a "divide by two" circuit to decrement the counter 23. When the contents of the counter 23 is decremented to zero, an output signal from the counter is used to inhibit the master oscillator 24 from producing further timing pulses. The absence of timing pulses on the sync line over a predetermined period is sensed by the reset timer 28, and at the end of that predetermined period, it generates a signal which loads the contents of the master encoder into the counter 23, thus releasing the master oscillator and initiating a new frame.

Turning now to the transmitter 11, it includes an encoder 30, having its outputs connected in parallel to the inputs of a decrementing counter 31. The signal from the sync line 15 is coupled to the clock input of a CLK flip flop 32 and to a reset timer 33. Persons skilled in the art will appreciate that suitable filtering, well known in the art, may be used at all locations where signals are derived from either the signal line 14 or the sync line 15. The "1" output of the flip-flop 32 is used to decrement the counter 31; and complementary outputs from the flip flop 32 are connected to gate circuits 34. The output of the reset timer 33 is used to load the contents of the encoder 30 into the counter 31 at the beginning of each frame. The output of sensor 17 is connected to the gate circuits 34, and the output of the gate circuits is coupled through a line driver 35 to the signal line 14.

Briefly, the transmitter operates as follows. The sensor 17 generates a binary signal—that is, the output of the sensor 17 is in one of two states. In its more general aspects, however, the invention is not limited to the use of binary sensors, but most sensors in commercial use for which the invention is presently intended fit this category. The output signal of sensor 17 (in complementary form) is fed to the gate circuits 34 and is present at all times. The absence of pulses on the sync line 15 defines the reset signal portion of the sync signal; and the reset timer 33 detects this reset signal portion of the sync signal, and loads the contents of the encoder 30 into the counter 31. The contents of the encoder 30, as mentioned above, is a binary word representative of the time slot allocated to transmitter No. 1. After the counter 31 is loaded and sync pulses are transmitted on the sync line 15, the $\overline{CLK}$ flip flop 32 decrements the counter 31. When the counter 31 reaches a count of zero, an enable signal is fed to the gate circuits 34. The output of the flip flop 32 is combined in the gate circuits 34 with the output of the sensor 17 and enabled by the output of the counter 31 to transmit an ON signal during the $\overline{CLK}$ (true) period and an OFF signal during the CLK (not) period. In this manner, a failure that would cause the sensor signal to be high during both CLK and $\overline{\text{CLK}}$ period will result in an "OFF" signal to the load or control device. In other words, ambiguous signals result in an off condition at the control device. Further, the absence of a signal during both the CLK and $\overline{\text{CLK}}$ periods does not affect the existing state of the control device—if it is on, it stays on; and if it is off, it stays off.

Referring now to the receiver 13, it includes an encoder 37 similar to the previously described encoders 22 and 30, and having a plurality of outputs connected in parallel to the inputs of a decrementing counter 38. The counter 38 generates a signal when its contents is decremented to zero, and this signal is fed to the inputs of gates 39, 40, the outputs of which feed respectively the JK inputs of a flip flop 41. The output of the flip flop 41 is used to activate the control device 19. The receiver 31 includes a reset timer 42 which is responsive to the reset signal portion of the sync signal for loading the contents of the encoder into the counter 38. The receiver also includes a CLK flip flop 43 which is responsive to the periodic signal portion of the sync signal for decrementing the counter 38. The complementary outputs of the flip flop 43 are also fed to the gates 39, 40 respectively, as illustrated.

The receiver operates as follows. A strobe signal generator 45 receives the signal on the sync line and feeds the clock input of flip flop 41. The reset timer 42 is responsive to the reset signal portion of the sync signal for loading the contents of the encoder 37 into the counter 38. Thereafter, the periodic portion of the sync signal is fed to the flip flop 43 to decrement the counter 38. When the counter 38 is decremented to zero, it sends an enable signal to the gates 39, 40. The actuation signal on the signal line 14 is also coupled to the gates 39, 40, and at the appropriate time (determined by strobe generator 45) during the time slot allocated to Receiver No. 1, the signal on line 14 is gated through the gates 39, 40 to the flip flop 41 from which it is used to activate the control device 19. The strobe signal is derived by delaying the sync signal, as will be explained. As a result, if both inputs to flip flop 41 are low at strobe time, its output remains unchanged. If gate 39 is enabled at strobe time, flip flop 41 is set; and if gate 40 is enabled at strobe time, flip flop 41 is reset. The control device 19 is controlled accordingly.

The counters of the Master Synchronizer and all transmitters and receivers are reset at the beginning of each time frame; and in the preferred embodiment, this is accomplished by sensing the absence of periodic synchronization signals. If it is desired to have the control device 19 actuated by sensor 17, then the contents of encoder 30 and the contents of encoder 37 are made identical. The contents of these two encoders may be established by direct wiring, the use of manually controlled switches, semiconductor switches, or any number of other techniques. It will also be appreciated that any number of receivers may be allotted to the same time slot and thereby controlled by the same sensor. One advantage of the present invention is that a given receiver may be assigned to a different transmitter simply by changing the contents of its encoder. Conversely, a given transmitter may be assigned to a different receiver in the same manner.

Figure 2:
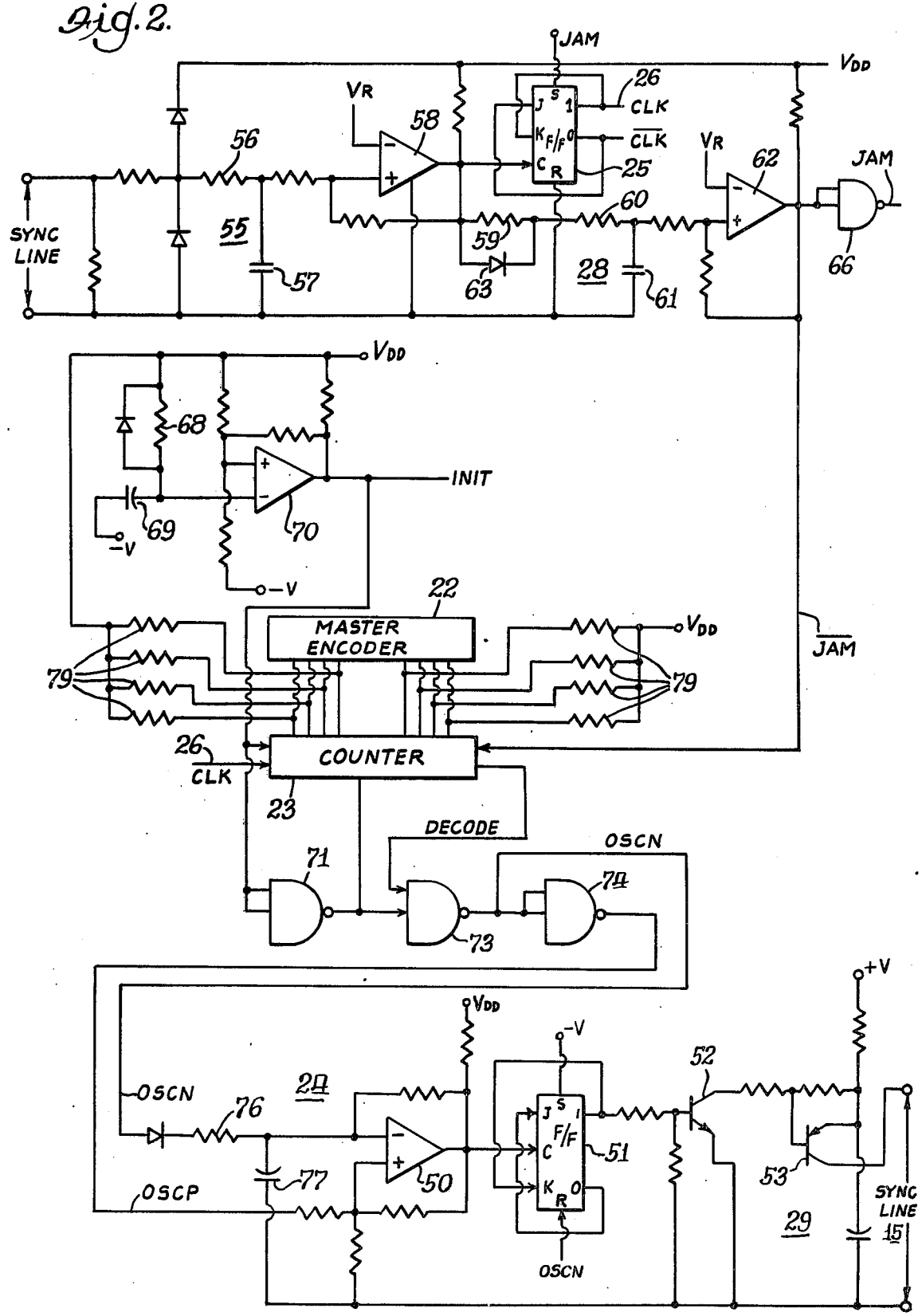
FIG. 2 is a circuit schematic diagram, partly in functional block form, of a Master Synchronizer used in the system of FIG. 1.

Referring now to FIG. 2, the master encoder 22, counter 23, clock flip flop 25 and master oscillator 24 are repeated. The master oscillator includes a comparator 50 having its output connected to the clock (C) input of a flip flop 51 used to divide by two the frequency of the comparator which, in one example, is set at 10 kHz. One output of the flip flop 51 is fed to the base of a transistor 52 acting as a buffer amplifier feeding the base of a transistor 53 in the line driver 29. For greater drive, if desired, the output stage 53 can be a complementary pair of transistors. The output of the line driver is taken between common and the collector of amplifier 53. Referring now to the upper left hand corner of FIG. 2, the resulting 5 kHz sync signal is fed through a filter section generally designated 55 and including a resistor 56 and a capacitor 57 which form a delay time constant, to be described. The signal is coupled to the positive input of a comparator amplifier 58, the negative input of which is connected to a reference voltage $V_R$. The output of the comparator 58 is fed via a circuit comprising series resistors 59, 60 and a capacitor 61 to the positive input of another comparator 62, the negative input of which is also connected to $V_R$. The resistor 59 has a diode 63 connected in parallel with it in the polarity shown. The resistor 59 is approximately ten times the value of the resistor 60, and resistor 59 is shunted by diode 63 when a positive pulse from the comparator 58 is used to charge the capacitor 61. However, the discharge path of the capacitor 61 includes the resistor 59 since the diode 63 is reversed-biased. Hence, the charging time of the capacitor 61 is much shorter than its discharge time; and the function of this will be described in more detail below. The output of the comparator is a signal referred to as $\overline{\text{JAM}}$; and this signal is coupled to the counter 23 to load the contents of the master encoder 22. The output of the comparator 62 is inverted in a conventional inverter circuit 66 to provide a signal referred to as JAM.

Still referring to FIG. 2, a resistor 68 and capacitor 69 are connected in series between the positive and negative supplies as illustrated, and the junction between these two is connected to the negative input of a comparator circuit 70, the positive input of which is connected to a reference voltage derived from the power supply. The voltage at the negative terminal of the comparator will be at the value of the negative power supply when the system is turned on, and it will gradually increase according to the time constant of the resistor 68 and capacitor 69. When the voltage across the capacitor 69 becomes greater than the reference voltage set at the positive input terminal of the comparator 70, the comparator will change states. The output voltage of comparator 70 is a signal identified as INIT, and it is fed to the counter 23 and to the input of a NAND gate 71, used as an inverter. This signal is used to hold the counter and the oscillator for an initial period of time until the power supply levels have stabilized. In other words, when the system is first turned on, the output of the comparator 70 is a positive signal which inhibits the counter 23 and also inhibits the oscillator for a time designated T1 on line L1 of FIG. 6. The voltage on the line L1 is representative of the output signal of the comparator 70. The output of gate 71 is fed to a second NAND gate 73 receiving a second input from the output of the counter 23. The output of the NAND gate 73 is a signal designated OSCN, described above. The output of gate 73 is fed to a third NAND gate 74 operating as an inverter to generate the previously described signal OSCP. When the signal INIT goes low, the signal OSCN also goes low and the signal OSCP goes high. However, OSCN is fed to the negative input of comparator 50 through a resistor 76 and capacitor 77 which establishes a slight delay. Hence, the oscillator 24 will not commence oscillation for a second time delay identified as time T2 in line L2 of FIG. 6, this line being representative of the output of the flip flop 51 which is fed by the oscillator 50. The output signal from the counter 23 which is fed to the NAND gate 73 is generated when the counter is decremented to zero and it is a low signal which changes the states of OSCN and OSCP, thereby terminating operation of the oscillator 50 when the counter 23 is decremented to zero.

The number of time slots in a given frame is determined by the master encoder 22 which is set to a number N+1 where N represents the number of time slots. A group of eight resistors 79 are connected between the positive supply and the inputs of the counter 23. In the event that the master encoder 22 is inoperative, these resistors will force the counter to the maximum count of 256, and the system will still operate. The same is true in each of the counters of the individual transmitters and receivers. In the case of the Master Synchronizer, the number of time frames will be increased perhaps, but the system will operate nevertheless since each individual transmitter and receiver recognizes only its own time slot. In the case of transmitters and receivers, if their associated encoder is inoperative, that particular station will be cut off automatically because it will have the same or greater code as the Master Synchronizer and there is no associated time slot for communication. The output signal from the counter which is fed to the NAND gate 73 is called $\overline{DECODE}$, and as indicated above, it terminates operation of the oscillator 50 when the counter 23 has decremented to zero.

In operation, the Master Synchronizer is first turned on. After the delay time T1 determined by the values of resistor 68 and capacitor 69, the output signal of differential comparator 70 (INIT) changes state and goes low to enable the counter 23 and to generate the signals OSCN and OSCP. The signal OSCN is used to reset the flip flop 51, and it is also coupled through a delay circuit comprising resistor 76 and capacitor 77 which determine delay time T2 of line L2 of FIG. 6 (as well as the frequency of oscillation), to the oscillator 50 to commence oscillation. The output of the oscillator 50 is used to clock the flip flop 51; and the output of the flip flop 51 is amplified in the line driver 29 and coupled to the sync line 15 where it is fed to the transmitters and receivers. The sync signal is also coupled through the delay circuit including resistor 56 and capacitor 57 (which form delay time T3 in line L3 of FIG. 6) to the positive input of differential comparator 58 which shapes the sync pulse and feeds it to the clock input of flip flop 25, the complementary outputs of which are designated CLK and $\overline{CLK}$. The signal on line L3 of FIG. 6 is the shaped sync signal at the output of comparator 58.

At the time the first clock signal is received by the flip flop 25 from the comparator 58, the signal JAM is high because the same clock input from comparator 58 is delayed by resistor 60 and capacitor 61 to the input of comparator 62. Thus, the flip flop 25 ignores the first clock input and it is held with the CLK output high because the JAM signal causes it to remain in the set condition. The JAM signal is therefore released as shown in line L4 of FIG. 6 after a time constant T4 defined by the values of resistor 60 and capacitor 61, it being realized that a positive signal will be shunted across resistor 59 through diode 63. As indicated in line L4, the JAM signal will remain low as long as incoming pulses are received to charge capacitor 61 at a rate faster than charge leaks off the capacitor. This will cause the plus input of comparator 62 to remain higher than the $V_R$ fed to the negative input. The resulting $\overline{JAM}$ signal, when it occurs as indicated in line L4 causes the counter 23 to be loaded with the contents of the master encoder 22.

Figure 6:
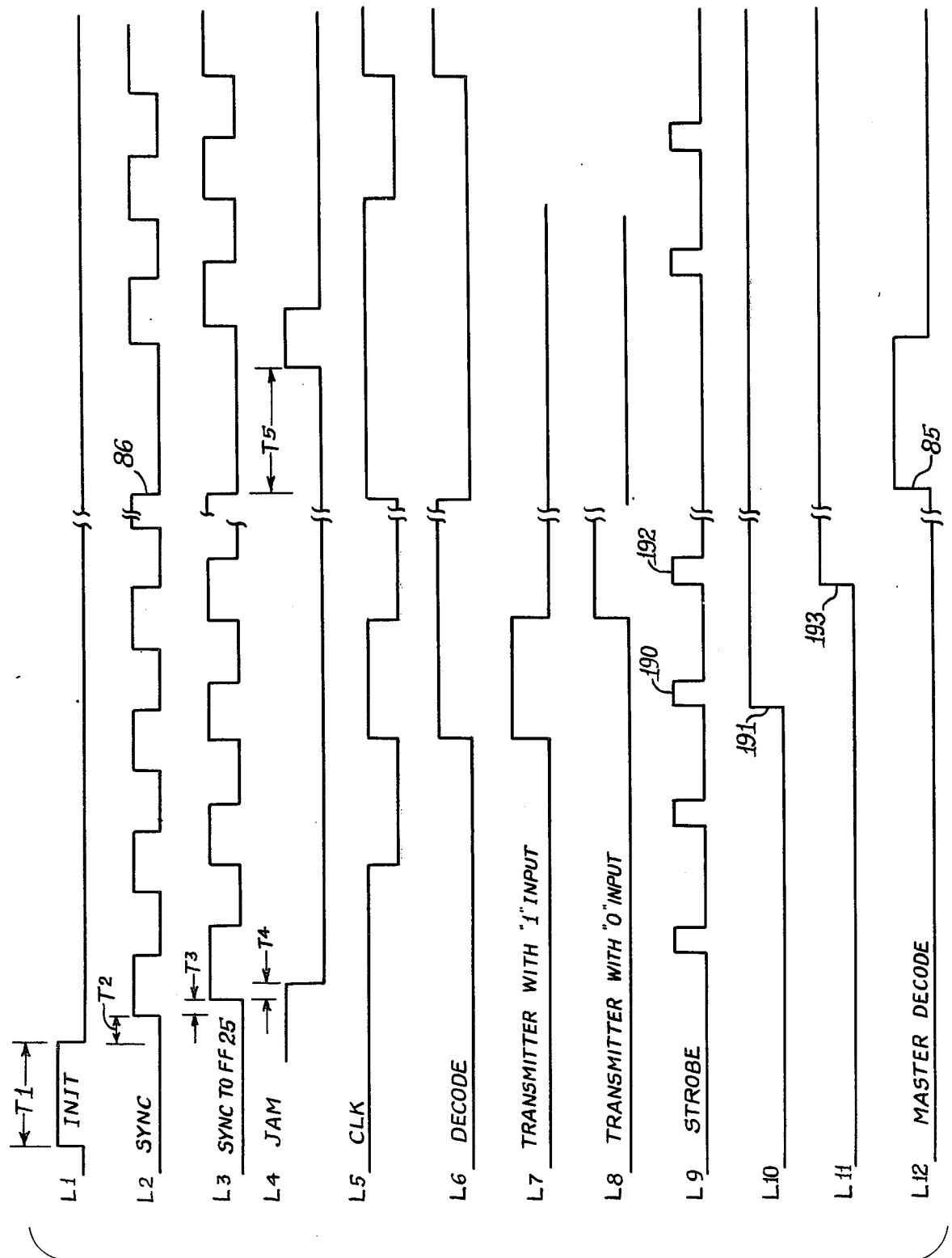
FIG. 6 is a timing diagram illustrating various operating waveforms in the system.

With the JAM signal thus released after the first positive excursion of the output of the comparator 58, the flip flop 25 will respond to subsequent positive-going leading edges to generate the CLK signal seen in line L5 of FIG. 6. The CLK signal thus corresponds to the sync signal counted down by a factor of 2. The CLK signal from the flip flop 25 is, as mentioned, coupled via line 26 to decrement the counter 23. Insofar as the Master Synchronizer is concerned, it is not known which transmitters are communicating with which receivers during any given time slot of the overall time frame. Each positive excursion of the 5 kHz signal of line L3 is used to cause the CLK flip flop 25 to change states, the output of this flip flop, the signal CLK, is used to decrement the counter 23. In terminating the operation of the Master Synchronizer for a frame, when the counter 23 is decremented to zero, the signal DECODE goes low. This signal, inverted, is shown on line L12 of FIG. 2; and when it goes low, it changes the output state of gate 73, thereby changing the states of signals OSCN and OSCP. This action terminates operation of the oscillator 50 and immediately resets the flip flop 51, thereby causing the 5 kHz sync signal to go negative as indicated at 86 on line L2. This results, after delay time T3 (discharge of capacitor 57), in terminating the input to flip flop 25, and permitting the capacitor 61 to discharge. When the capacitor 61 has discharged through resistors 60 and 59 to a point where the positive input on the differential comparator 62 goes below the reference voltage on its negative input, then the signal $\overline{JAM}$ will go low, to re-load the contents of the master encoder 22 into the counter 23. This longer delay is defined as time constant T5 in FIG. 6. At the same time, the output of the gate 66, namely the signal JAM inhibits operation of the flip flop 25 for the first cycle of the next frame. The JAM signal sets the CLK flip flop in transmitters and receivers, as well, for these reasons: (a) if the CLK is falsely triggered, the JAM signal brings it back into synchronism with the rest of the system on the next frame; (b) to insure that the CLK flip flop is in a known state when power is turned on; and (c) the first sync pulse derives the strobe for CLK "true" DECODE "0" to protect against ambiguities that would occur if the transmitted signal remained high.

Operation of the master oscillator continues cyclically in the manner described, the number of time slots being determined by the contents of the master encoder 22. It should be noted that the discharge time constant of the capacitor 61 in the case of the Master Synchronizer is longer than a corresponding discharge time constant, to be described below, for the receivers and transmitters. The reason for this is that the transmitters and receivers will be ready for operation at the time the Master Synchronizer begins to generate sync pulses. At the end of each time frame, as indicated above, the counter 23 is decremented to zero, and a signal $\overline{DECODE}$ is generated by the counter and fed to the gate 73. This signal (inverted) is shown on line L12 of FIG. 6. When it goes positive at 85 on line L12, the signals OSCN and OSCP change states thereby terminating the operation of oscillator 50 resulting in a shortened sync pulse at 86, and after time delay determined by T3, the termination of the sync pulse to flip flop 25. This completes a time frame until the capacitor 61 discharges (T5) as described above, to release the counter 23 by the complement of the signal shown on line L4.

Turning now to FIG. 3, the transmitter is similar in operation to the master encoder just described in many of its aspects, and need not be disclosed in such detail. It includes an encoder 90 which contains minor information representative of a particular time slot at which time it is desired to have this particular transmitter communicate with its associated receivers. The outputs of the encoder 90 are coupled in parallel to a counter 91. The counter 91 is decremented by a signal CLK derived from a flip flop 93, to be described. When the counter 91 is decremented to a zero count, it generates a signal $\overline{DECODE}$ which is inverted in an inverter circuit 94 and coupled as a DECODE signal to a first and second NAND gates 95, 96. The NAND gates 95, 96 receive respectively the signals CLK and its complement $\overline{CLK}$. These gates also receive the complementary outputs of a flip flop 98, the input signals to which are identified as SWON and $\overline{SWON}$ which are complementary binary signals representative of the state of a sensor such as the one designated 17 in FIG. 1 to be described below. The output signals of the NAND gates 95, 96 are combined in a gate 99 which feeds a voltage level converter 100 (in the form of a comparator) which, in turn, feeds a line driver 101, the output of which is coupled to the signal line 14.

The 5 kHz sync signal from the sync line 15 is coupled to the transmitter in the upper left hand corner and fed through a delay circuit generally designated 105 to the positive input of a comparator 106. The output of the comparator 106 feeds the clock input of a flip flop 93 which generates the signal CLK.

The output of comparator 106 (the other input of which is referenced to $V_R$), is connected to a delay circuit 109 to a comparator 114. The delay circuit 109 includes a pair of resistors 110, 111 connected in series to a capacitor 112. The resistor 110 is shunted by a diode 113, and this delay circuit is similar in operation to the previously described delay circuit 28 except that the resistor 110, as described above, is smaller in value than the resistor 59 in FIG. 2. This is to permit release of the transmitter JAM signal prior to release of the Master Synchronizer JAM signal. The transmitter includes an initialization circuit generally designated 116 similar to the one previously described except that it includes two inverting amplifiers 117 (which generates the signal INIT to enable the counter 91) and a second inverter 118 (which generates the complementary signal $\overline{INIT}$). Similarly, the inputs to the counter 91 are coupled to the positive voltage supply by means of eight individual resistors respectively so that if the encoder 90 falls, the particular transmitter will be taken out of operation, but the system will operate.

In operation, again, it is the absence of sync pulses which permits the capacitor 112 to discharge, and after a predetermined time, the $\overline{JAM}$ will go low, thereby loading the contents of the encoder 90 into the counter 91. Thereafter, the incoming sync pulses form the Master Synchronizer are delayed via an integrator circuit 105 (for filtering) and fed through the comparator 106 to trigger the flip flop 93 to generate the CLK signal which is one half the frequency of the incoming sync signal. The signal CLK is used to decrement the counter 91 after it is loaded with the contents of encoder 90; and when the counter 91 is decremented to zero, it generates the signal $\overline{DECODE}$, and this signal is used to generate an enable signal to the gates 95, 96. If the signal SWON is positive, then the one output of flip flop 98 is positive and during the positive half cycle of CLK, the gate 95 will generate a pulse such as the one shown (inverted) on line L7 of FIG. 6 during the first half cycle of the CLK signal during the time slot associated with that particular transmitter. If the output of the sensor is a zero or low signal, then the zero output of the flip flop 98 is high. During the next cycle of the signal CLK, the gate 96 will generate a pulse such as the one shown (also inverted) on line L8 of FIG. 6.

Referring now to FIG. 4, there is shown a circuit schematic diagram for the logic power supply including an input transformer 125 having a center-tapped secondary which feeds a conventional rectifier and filter 126, the output voltage levels being designated $+V$, $V_{DD}$ and $-V$. The voltage $V_{DD}$ is generated by means of a Zener diode 127. The primary of transformer 125 is connected to a conventional 120 volt source.

The ac signal input is connected to a terminal 130 which is fed through a filter and current limiter 131 and a full wave rectifier 132 to energize a photo diode 133 if a signal is present. The photo diode is provided in combination with a transistor 134 (sometimes collectively referred to as a "photocouple"), the output of which is fed through a delay circuit 135 to the positive input of a comparator 137, the negative input of which is connected to a reference voltage. The output of the comparator 137 will therefore either be a low voltage (if no ac voltage is received at the input 130 from the sensor) or a high voltage (if an ac input is received from the sensor at the input termina 130). The output of the comparator 137 generates the signal $\overline{SWON}$, and when it is coupled to an inverter 138, the signal SWON is generated. The output of the comparator 137 may also be used to energize a local signal light 140, if desired. The signals SWON and $\overline{SWON}$ are fed to the J and K inputs respectively of the flip flop 98 in FIG. 3, as previously described.

Figure 5:
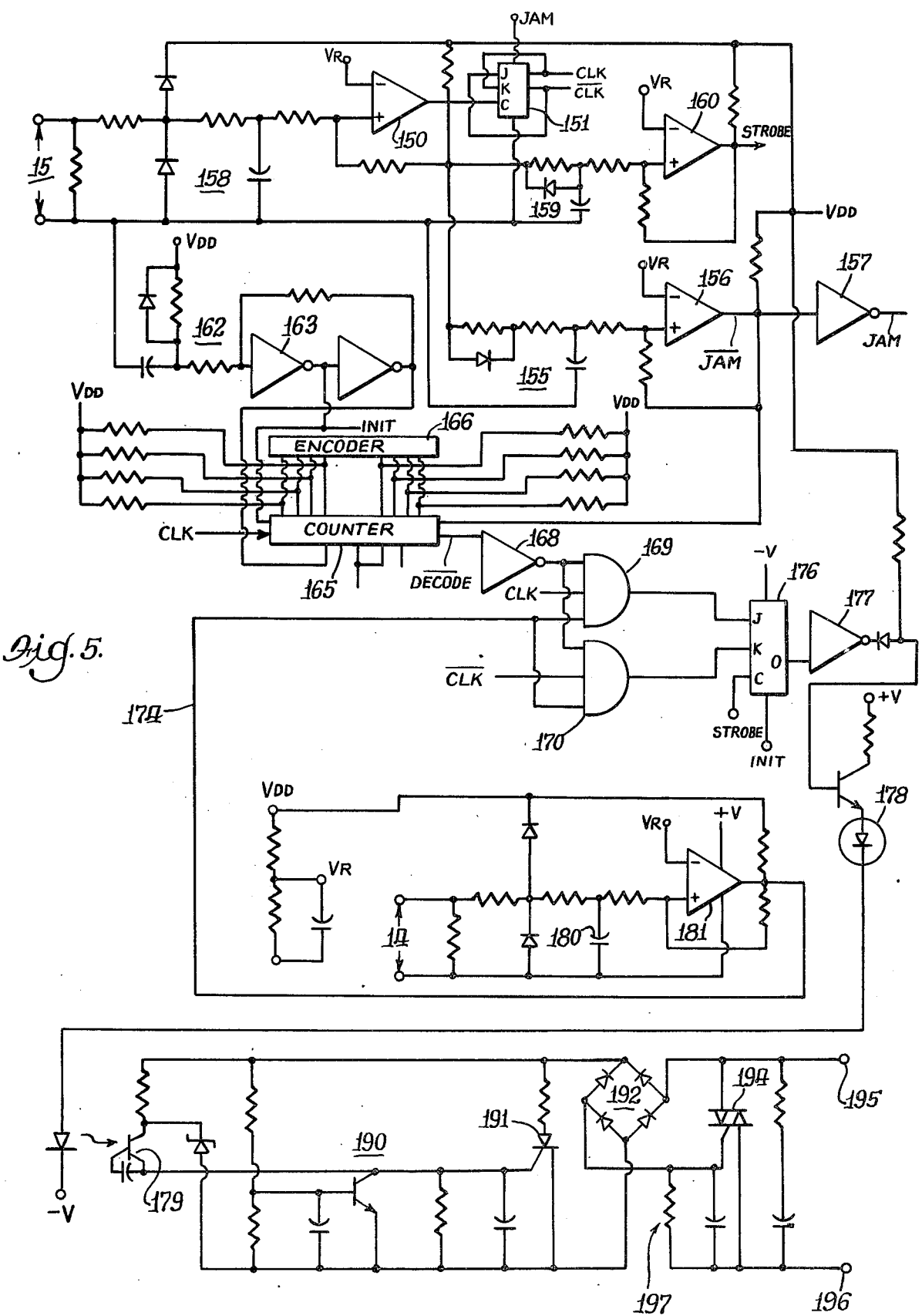
FIG. 5 is a circuit schematic diagram, partly in functional block form, of a receiver for actuating a control device in accordance with FIG. 1.

Turning now to FIG. 5, the receiver receives the 5 kHz sync signal from the sync line 15, and after initial filtering, it is fed to the positive input of a comparator circuit 150, the output of which is fed to the clock input of a flip flop 151, the outputs of which comprise the signals CLK and $\overline{CLK}$ for each receiver. The output of the comparator 150 is coupled through a delay circuit 155, similar to the previously described delay circuit 109 in the transmitter, and then to the positive input of another comparator 156, the output of which comprises the signal $\overline{JAM}$ for the transmitter. This signal is inverted in inverter circuit 157, the output of which comprises the signal JAM. The signal JAM is fed to the set input of the flip flop 151, as before.

The input sync signal is delayed prior to being fed to the comparator 150 by means of a delay circuit 158, similar to the previously described delay circuit 105. The output of the comparator 150 is further delayed by means of a delay circuit 159 which is fed to a strobe generator comprising a comparator 160. The delay circuit 159 delays the input to the comparator such that the strobe signal occurs at approximately the 40% point of the CLK and $\overline{CLK}$ periods, see line L9 of FIG. 6. This timing may be compared with the CLK signal of FIG. 5 since even though the CLK signal is locally generated in the Master Synchronizer, each transmitter and each receiver, these signals will nevertheless all be in synchronism because they are derived from the same incoming sync pulse on the sync line 15.

The receiver includes an initialization circuit 162 which generates the signal INIT derived from the output of an inverter circuit 163 and the $\overline{\text{INIT}}$ signal from a second inverter 163A. The signal INIT is fed to a decrementing counter 165; and an encoder 166 has its outputs connected to the inputs of the counter 165. The counter 165 is loaded by the signal $\overline{\text{JAM}}$ to receive the contents of the encoder 166, and it is decremented by the signal CLK. When its count reaches zero, it generates the signal $\overline{\text{DECODE}}$ which is fed to an inverter 168, the output of which is connected to first and second AND gates 169 and 170. Each of these AND gates is a three-input gate. One of the other inputs to the gate 169 is the signal CLK, and one of the other inputs to the gate 170 is the signal $\overline{\text{CLK}}$. The third input to each of the gates is the input signal received on a line 174. The outputs of the AND gates 169, 170 are fed respectively to the J and K inputs of a flip flop 176. The STROBE signal from the differential comparator 160 is fed to the clock input of the flip flop 176. The output signal of the flip flop 176 is fed through an inverter 177 to energize a display LED 178 and a photocouple circuit 179, described below.

The input signal is received from the signal line 14 in the lower third of the page of FIG. 5; and it is filtered by means of a conventional filter circuit 180 and coupled to the positive input of a comparator 181, the output signal of which is coupled via line 174 to the gates 169, 170.

If the input signal is "true" or "one" as indicated on line L7 of FIG. 6, then a strobe pulse such as the one designated 190 occurring in the first half cycle of the local clock signal will cause the "one" output of the flip flop 176 to go "high" as at 191 on line L10. Similarly, if the input signal had been "false" or "zero" as indicated on line L8 of FIG. 6, then the "zero" output of flip flop 176 will go high when the strobe pulse 192 clocks the flip flop 176, the output being indicated on line L11, and going high at 193.

In either case, as indicated above, an energy-containing pulse is required to actuate the flip flop 176, as well as the photocouple 179. The output of photocouple 179 is fed to a conventional zero voltage detector circuit generally designated 190, which is coupled to the gate lead of an SCR 191 to cause it to conduct only when the anode voltage crosses zero volts.

The SCR 191 is connected across a bridge circuit 192 the input to the bridge is connected in series with a resistor 197 between a source of ac voltage (terminal 195) and a load device (terminal 196) to be controlled or actuated. In operation, when an incoming signal causes the photocouple to conduct, SCR 191 also conducts. This, in turn, will cause current to flow through bridge 192 and resistor 197 to apply a gate voltage to cause the triac 194 to conduct, thus connecting the load to the ac source. The bridge circuit 192 powers circuits 179, 190 and 191, and the source is regulated by the Zener illustrated. The firing circuit is conventional and operates as follows: Once triac 194 conducts, all current is shunted through it to the load. Thus, no voltage is available in the trigger circuit until the next zero crossing, at which time the triac is turned off. Voltage then builds up in the trigger circuit until the photocouple conducts again to trigger the SCR 191, and the cycle repeats until the photocouple is deactivated.

Having thus disclosed in detail a preferred embodiment of the invention, persons skilled in the art will be able to modify certain of the circuitry which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. A multiplex system for communicating a sensor device with a remotely located control device comprising:
   a synchronization line;
   a signal line;
   master synchronization circuit means for generating a synchronization signal coupled to said synchronization line, said synchronization signal being generated each time frame and including a periodic signal portion and a reset signal portion, each cycle of said periodic signal portion defining a time slot in said time frame;
   a plurality of transmitters, each including triggerable counter circuit means and being connected to said synchronization line and said signal line and responsive to said reset signal portion of said synchronization signal for loading a predetermined count representative of an assigned time slot into said counter means, said synchronization signal portion being operative to trigger all transmitter counter circuit means simultaneously, each transmitter further including gating circuit means responsive to said counter circuit means reaching a predetermined count for coupling an output signal of said sensor to said signal line; and
   a plurality of receivers, each including triggerable counter circuit means and being connected to said synchronization line and said signal line and responsive to said reset signal portion of said synchronization signal for loading a predetermined count representative of an assigned time slot into said receiver counter means, said periodic signal portion being operative to trigger all of said receiver counter circuit means simultaneously, each receiver further including output circuit means responsive to said counter circuit means reaching a predetermined count for coupling a signal on said signal line to an associated control device during the time slot associated with that receiver.

2. The apparatus of claim 1 wherein said master synchronization circuit means includes oscillator circuit means responsive to a control signal for generating said periodic signal portion when said control signal is in a first state and for generating said reset signal portion when said control signal is in a second state, said master synchronization circuit means further including triggerable counter circuit means for generating an output signal when the contents thereof reach a predetermined count at least as great as the number of time slots in a frame; reset circuit means responsive to the absence of an output signal from said oscillator means for a predetermined time for loading said counter circuit means to a predetermined count for initiating an operation of said oscillator circuit means; circuit means for triggering said counter circuit means responsive to the periodic signal portion of said synchronization signal, the output signal of said counter circuit means inhibiting further operation of said oscillator circuit means until said counter circuit means is re-loaded by said reset by said timer circuit means.

3. The apparatus of claim 2 wherein said reset signal portion of said synchronization signal consists of the absence of periodic signals from said oscillator circuit means.

4. The apparatus of claim 2 wherein each of said transmitters and receivers further includes a reset timer circuit means responsive to said reset signal portion of said synchronization signal for re-loading associated counter circuit means, the reset signal time of said Master Synchronizer being longer than the reset signal time of said transmitters and receivers.

5. The apparatus of claim 1 wherein said system includes a plurality of sensor devices capable of generating a binary signal having first and second states, and a plurality of control devices capable of responding to a binary signal having first and second states, each transmitter including clock circuit means responsive to said periodic signal portion of said synchronization signal for generating a clock signal; output gate circuit means responsive to the output signal of said transmitter counter circuit means and to the binary output signal of an associated sensor device and to said clock signal for generating a first output pulse signal on said signal line during one portion of said clock signal if said sensor device is in a first binary state and for generating a second output pulse signal on said signal line during a second portion of said clock signal if said sensor device is in said second binary state.

6. The apparatus of claim 5 wherein each of said receivers includes clock circuit means for generating a clock signal; strobe generator circuit means responsive to said clock signal for generating a strobe signal a predetermined time after said clock signal; output gating circuit means responsive to the output signal of said receiver counter circuit means and the receiver clock signal and the signal on said signal line from an associated transmitter; and output circuit means responsive to said gating circuit means and to said strobe signal for generating a first signal if the sensor of an associated transmitter is in a first binary state and a second signal if the sensor associated with said transmitter is in a second binary state.

7. The apparatus of claim 1 wherein each of said master synchronization circuit means includes decrementing counter circuit means; encoder circuit means for storing signals representative of the number of cycles desired in said periodic signal portion of said synchronization signal; master oscillator circuit means for generating an oscillatory signal only when said counter circuit means is not decremented to zero; reset timer circuit means responsive to the absence of an output signal from said master oscillator circuit means for a predetermined time for re-loading the contents of said encoder circuit means to said counter to re-initiate a time frame; and clock circuit means responsive to the output signal of said master oscillator means for decrementing said counter means.

8. The apparatus of claim 7 wherein said master synchronization circuit means further comprises initializing circuit means responsive to the turning on of power for generating an initialization signal to enable said counter circuit means and to enable said master oscillator circuit means.

9. A time division multiplex control system for selectively communicating a plurality of sensors with associated remote control devices over a signal line, comprising:

a sync line;
master synchronization circuit means for generating a periodic time frame signal on said sync line, each time frame signal including a reset signal portion and a periodic signal portion, said periodic signal portion defining time slots in said frame, a time slot being allocated to each transmitter and its associated receiver or receivers;
transmitter circuit means for each sensor, each transmitter comprising storage means for storing signals representative of an assigned time slot; triggerable counter circuit means for generating an output signal when the contents thereof reach a predetermined count; reset circuit means responsive to the reset signal portion of said synchronization signal for transferring the contents of said storage means to said counter circuit means; clock circuit means responsive only to the periodic signal portion of said synchronization signal for triggering said counter circuit means in timed relation therewith; and output gate circuit means responsive to said output signal of said counter circuit means for coupling the output signal of the associated sensor to said signal line when said counter circuit means has reached said predetermined count;
receiver circuit means for each control device, each receiver comprising storage means for storing signals representative of an assigned time slot; triggerable counter circuit means for generating an output signal when the contents thereof reach a predetermined count; reset circuit means responsive to the reset signal portion of said synchronization signal for transferring the contents of said storage means to said counter circuit means; circuit means responsive only to the periodic signal portion of said synchronization signal for triggering said counter circuit means in timed relation therewith; and output gate circuit means responsive to said output signal of said counter circuit means for coupling a signal on said signal line from an associated transmitter when said counter circuit means has reached said predetermined count to control the associated control device.

10. In a time division multiplex control system for selectively communicating a plurality of sensors with associated remote control devices over a single signal line, the combination comprising:

a sync line;
master synchronization circuit means for generating a periodic time frame signal on said sync line, each time frame signal including a reset signal portion in which no signal appears on said sync line and a periodic signal portion defining time slots in said frame, a time slot being allocated to each transmitter and its associated receiver or receivers; a plurality of transmitters, one for each sensor and including a decrementing counter circuit; reset timer circuit means responsive to the reset signal portion of said synchronization signal for loading a predetermined count into said counter circuit means; clock generator circuit means for decrementing said counter in timed relation with said periodic signal portion of said synchronization signal for generating an output signal when the contents thereof reach zero; an output gate circuit means responsive to the output signal of said counter circuit means and to said clock signal for communicating an associated sensor to said signal line when the contents of said counter are decremented to zero; and a receiver circuit means associated with each transmitter circuit means and enabled only during an assigned time slot for communicating the signal on said signal line during said assigned time slot to an associated control device.

11. A multiplex system for communicating a sensor device with a remotely located control device comprising:

a synchronization line;

a signal line;

master synchronization circuit means for generating a synchronization signal coupled to said synchronization line, said synchronization signal being generated each time frame and including a periodic signal portion and a reset signal portion, each cycle of said periodic signal portion defining a time slot in said time frame;

a plurality of transmitters, each including first circuit means and being connected to said synchronization line and said signal line and responsive to said reset signal portion of said synchronization signal for storing predetermined count signals representative of a time slot associated with a respective transmitter, said periodic signal portion being operative to change the contents of all of said first circuit means simultaneously by a predetermined increment, each transmitter further including gating circuit means responsive to said first circuit means reaching a predetermined count for coupling an output signal of said sensor to said signal line; and a plurality of receivers, each including second circuit means and being connected to said synchronization line and said signal line and responsive to said reset signal portion of said synchronization signal for storing predetermined count signals representative of a time slot associated with a respective receiver, said periodic signal portion being operative to trigger all of said second circuit means simultaneously by said predetermined increment, each receiver further including output circuit means responsive to said second circuit means reaching a predetermined count for coupling a signal on said signal line to an associated control device during the time slot associated with that receiver.

* * * * *